Dec. 17, 1968     J. E. SCANLAND     3,416,845
TRACK BELT FOR MOTOR DRIVEN VEHICLE
Original Filed Oct. 14, 1965
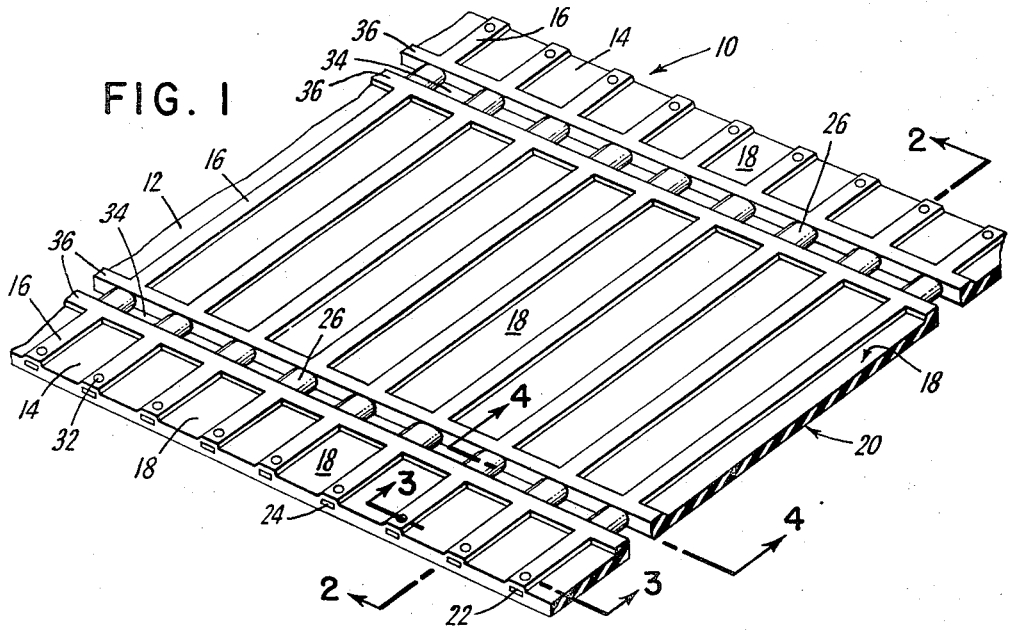
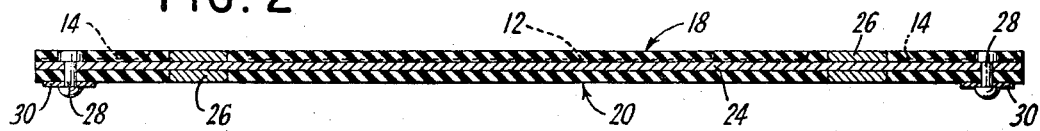
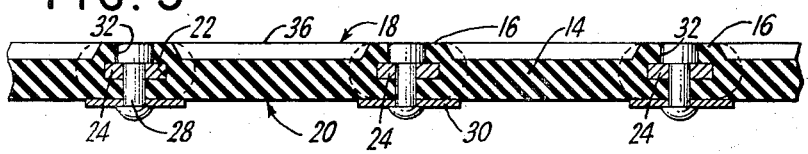
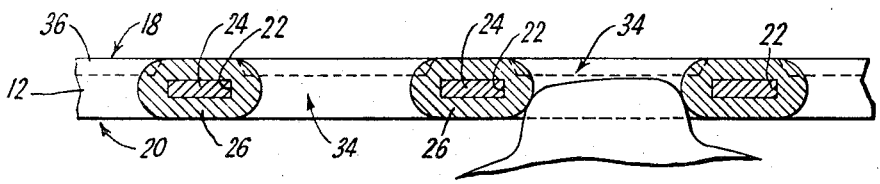
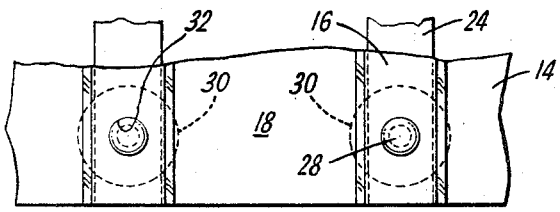
INVENTOR
JOSEPH E. SCANLAND
BY
ATTORNEY United States Patent Office 3,416,845
Patented Dec. 17, 1968

3,416,845
TRACK BELT FOR MOTOR DRIVEN VEHICLE
Joseph Eugene Scanland, Des Moines, Iowa, assignor to American Machine & Foundry Company, a corporation of New Jersey
Continuation of application Ser. No. 495,958, Oct. 14, 1965. This application June 30, 1967, Ser. No. 650,549
4 Claims. (Cl. 305—38)

ABSTRACT OF THE DISCLOSURE

A track belt for a motor driven vehicle comprising a median elastomeric belt element and separate first and second outer elastomeric belt elements. A plurality of transversely disposed reinforcing rods extend through apertures in the belt element to interconnect said first and second outer belt elements. The invention also includes sprocket engaging elements mounted on the rods between the belt elements and means for securing the outer belt elements to the rods.

---

This application is a continuation of application Ser. No. 495,958, filed Oct. 14, 1965, now abandoned.

The present invention relates to endless driving belts for track type motor driven vehicles, and more particularly to a track belt having an improved rubber and metal composite construction.

It is well known that self-laying track type vehicles, i.e., vehicles which move on sprocket driven endless belts or tracks, can be satisfactorily employed under circumstances in which wheeled vehicles are effectively useless. Such circumstances include extremely uneven terrain, soft earth, sand, mud, ice, snow, etc.

One type of belt or track widely used for such vehicles consists of metal segments linked together to form an endless track having an outer traction surface and an inner surface with sprocket engaging elements formed thereon. Such metal tracks or belts are strong, long wearing and resist abrasion and abuse. On the the other hand, metal tracks have recognized disadvantages in that they are generally heavy, noisy in operation, are not well suited for operation over concrete or asphalt pavement and other like hard road surfaces, and are inflexible and consequently often times have insufficient surface engagement and traction when operated on highly uneven surfaces.

Tracks consisting of metal links with rubber tread inserts on the traction surfaces are used to reduce the noise level and damaging effect when the tracked vehicle is to be operated on hard surfaces such as asphalt or concrete. However, this expedient fails to overcome the other aforementioned disadvantages of metal tracks.

Rubber track belts strengthened and reinforced with metal inserts or cord fabric have heretofore been proposed for use in circumstances under which metal type tracks are unsatisfactory for reasons of weight, inflexibility, etc. However, the rubber type track belt constructions heretofore proposed have generally been expensive to produce and short lived, primarily due to excessive wear at the points at which the belt is engaged by the drive sprockets.

An object of the present invention is to provide a track belt for a motor driven vehicle which will overcome the problems hereinbefore pointed out.

Another object is to provide such a belt having a combination of desirable features of both metal track belts and rubber track belts.

Another object is to provide such a belt having the wear capability of a metal belt at the sprocket engaging surfaces and the lightness, flexibility and noiseless operation of a rubber belt.

A further object is to provide such a belt having metal reinforcing elements which resist flexure in the direction of travel of the belt and are readily flexible in the direction normal thereto.

Still a further object is to provide such a belt which can be easily and inexpensively manufactured.

Numerous other objects and advantages of the invention will be apparent as it is better understood from the following description, which, taken in connection with the accompanying drawings, discloses a preferred embodiment thereof.

Referring to the drawings:
FIGURE 1 is a perspective view of a portion of a track belt embodying features of the present invention;
FIGURE 2 is an enlarged sectional view taken along the line 2—2 of FIG. 1;
FIGURE 3 is an enlarged sectional view taken along the line 3—3 of FIG. 1;
FIGURE 4 is an enlarged sectional view taken along the line 4—4 of FIG. 1 and showing a portion of a drive sprocket in engagement with the belt; and
FIGURE 5 is an enlarged fragmentary view of a marginal portion of an outer belt element showing the manner in which the belt element is fastened to metal reinforcing bars.

As a preferred or exemplary embodiment of the instant invention, FIGURE 1 shows a track belt generally designated 10 having central and outer belt elements 12 and 14 respectively. The belt elements 12 and 14 are molded or otherwise formed from a resilient rubber composition or rubber-like material. If desired, the belt elements may be suitably reinforced with layers of woven fabric, cord, or metal wire to increase the resistance of the belt elements to longitudinal stretching.

The belt elements 12 and 14 are provided with a plurality of spaced transversely extending raised ribs 16 along a ground contacting face 18, and have an under face 20 which is generally flat in the embodiment illustrated. A plurality of spaced apertures 22 extend transversely through the belt elements 12 and 14 with the apertures being substantially centrally disposed in the ribs 16. The longitudinal spacing of the ribs 16 and apertures 22 corresponds to the pitch length of the drive sprocket with which the track belt is to be used for reasons which will be made clear.

The central and outer belt elements 12 and 14 respectively are interconnected by reinforcing bars 24 which extend through transversely aligned apertures 22 in the belt elements (FIG. 2). Metal spacers 26 positioned on the bars 24 between the central and outer belt elements 12 and 14 maintain a uniform transverse spacing between the central and outer belt elements. The bars 24 are fastened to the outer belt elements 14 adjacent the outer marginal edges of the belt elements by rivets 28. In the preferred embodiment the rivets 28 have their heads disposed adjacent the under face 20 of the belt elements, with washers 30 positioned between the rivet heads and the belt elements (FIG. 3). The shanks of the rivets 28 are suitably peened or upset against the reinforcing bars 24, with enlarged holes 32 extending from the ground contacting face 18 in alignment with the rivets providing the necessary access (FIG. 5).

The spacers 26 and adjacent surfaces of the belt elements 12 and 14 cooperatively form openings 34 adapted to be engaged by the teeth of the drive sprocket of the vehicle on which the track belt is to be used (FIG. 4). The spacers 26 are preferably formed of a metal or metal alloy having a high resistance to wear to minimize the enlargement of the openings 34 due to frictional engagement of the sprocket teeth against the surface of the spacers. Preferably, but not necessarily, the belt elements 12 and 14 are provided with longitudinally extending ribs 36 adjacent the spacers 26 to better define the sprocket openings 34 and to provide improved longitudinal strength in the belt element portions adjacent the sprocket openings.

In the preferred embodiment, the reinforcing bars 24 are rectangular in cross-section and have a relatively large dimension as measured longitudinally of the track belt 10 as compared to the dimension as measured normal to the ground contacting face 18. The track belt 10 is thus provided with a relatively high resistance to flexure in the longitudinal direction, or the direction in which the pulling force is exerted on the belt by the sprocket teeth. Consequently, the pulling or driving force is more evenly distributed across the entire transverse width of the track belt. At the same time, the bars 24 have a relatively much lower resistance to flexure in the direction normal to the ground contacting face 18. The track belt 10 thereby retains a substantial degree of flexibility in this direction and tends to follow and conform to irregularities in the surface over which it travels and provide greater surface contact and traction as compared to rigid metal track belts. It is to be understood, of course, that the bars 24 may have cross-sectional shapes other than rectangular. Irrespective of the shape used, it is desirable that it have a greater flexure strength in the longitudinal direction of the track belt 10 as compared to its flexure strength in the direction normal to the plane of the belt.

It is apparent from the foregoing that the composite rubber and metal track belt of the instant invention combines desirable features of the metal track belts and the rubber track belts heretofore known without the disadvantages inherent in each type. The metallic, wear-resistant sprocket engaging surfaces greatly increase the usable life of the track belt by minimizing the enlargement of the tooth openings and the undesirable looseness and backlash which results therefrom. The pulling force exerted on the belt by the drive sprocket teeth is distributed substantially uniformly across the full width of the belt. These features are generally characteristic of metal track belts but not of the rubber track belts heretofore proposed.

The composite track belt of the instant invention has, at the same time, advantages which are characteristic of rubber type track belts in that it is relatively flexible and tends to conform to irregularities in the surface over which it travels, is relatively light in weight as compared to metal track belts, and relatively quiet in operation as compared to metal track belts. The combination of wearability and lightness makes the track belt of the instant invention particularly well-suited for use on tracked vehicles to be used on sand or snow, in which circumstances overall light vehicle weight is advantageous. Moreover, the track belt described can be easily and economically manufactured since the belt elements 12 and 14 are independently molded or formed and subsequently combined to produce the track belt 10 of desired width.

It is thought that the invention and many of its advantages will be understood from the foregoing description and it will be understood that various changes may be made in the form, construction, and arrangement of the parts without departing from the spirit and scope of the invention or sacrificing all of its material advantages, the form hereinbefore described being merely a preferred embodiment thereof.

I claim:

1. A track belt comprising essentially three separate elongated strips of elastomeric material which are disposed along side each other in spaced relationship to define two continuous spaces therebetween, a plurality of spaced flat metallic strips extending transversely across said elastomeric strips and spaces through transverse aligned openings formed in said elastomeric strips, fastening means extending through said elastomeric strips and metallic strips solely at the two outer ones of said three elastomeric strips, the portions of said metallic strips extending across said two spaces being engaged and surrounded by annular metallic elements which are adapted to be engaged by a pair of sprocket wheels to drive said track belt, said annular elements being butted up at their opposite ends against the adjacent facing side edges of said three elastomeric strips to fixedly position the central one of said three elastomeric strips with respect to the two outer ones thereof, and the thickness of said three elastomeric strips being enlarged in selected portions thereof as compared the remaining part thereof to reinforce said selected portions and form a corrugated ground engaging surface solely on one face of said track belt, the other face of said track belt being essentially flat, said selected portions comprising the parts of said adjacent side edges positioned on said one face and the parts of said three elastomeric strips in alignment with said metallic strip on said one face.

2. A track belt for a motor driven track type vehicle having at least two spaced coaxially mounted drive sprockets, said track belt comprising:

a median elastomeric belt element having a transverse width equal to the spacing between said sprockets, separate first and second outer elastomeric belt elements, a plurality of transversely disposed metallic reinforcing rods embedded in and interconnecting said median and first and second outer belt elements, said rods extending outside the elastomeric belt elements to connect said elements and forming a plurality of spaced transversely disposed apertures extending through the belt between said elements with a uniform longitudinal spacing corresponding to the tooth pitch of said drive sprockets, sprocket engaging members disposed on said rods between said median and outer belt elements and abutting the adjacent edges thereof to maintain a uniform transverse spacing therebetween, said sprocket engaging members each comprising a metal member completely surrounding the exposed portion of the metal rods, and means for securing said outer belt elements to said rods, the outer belt elements each including a plurality of spaced apertures extending therethrough at the rod positions, and the means for securing said outer belt elements to said rods comprising at each outer belt element a rivet having its head disposed adjacent the undersurface of the belt element and a washer positioned between the rivet head and the belt elements, the shank of said rivet extending through the aperture in the belt element to connect said belt element to said rod, and the apertures in the outer belt elements being enlarged on the ground contacting face of the belt to permit access to the rivet, and the rods each including apertures in alignment with the belt apertures to permit mounting of the rivets therein.

3. The track belt of claim 2 wherein:

said reinforcing rods are substantially rectangular in cross-section with a substantially greater cross-sectional dimension as measured in the direction of the longitudinal dimension of said belt as compared to the cross-sectional dimension as measured in the direction normal to the plane of said belt.

4. The track belt of claim 3 wherein:

said rods are spring steel material and readily flexible in the direction normal to the plane of the belt and substantially inflexible in the longitudinal direction of said belt.

References Cited

UNITED STATES PATENTS

| | | | |
|---|---|---|---|
| 2,326,719 | 8/1943 | Myers | 305—38 |
| 2,449,421 | 9/1948 | Slemmons | 305—38 |
| 2,899,242 | 8/1959 | Bombardier | 305—38 |
| 3,011,576 | 12/1961 | Howes | 305—35 X |
| 3,282,630 | 11/1966 | Harrison | 305—38 |
| 3,285,677 | 11/1966 | Marier | 305—38 |
| 2,012,958 | 9/1935 | Colby | 305—38 |

RICHARD J. JOHNSON, *Primary Examiner.*